Feb. 8, 1966  Y. M. MARTINEZ  3,234,495
ROTARY ELECTRIC COUPLING
Filed Feb. 8, 1963  3 Sheets-Sheet 1
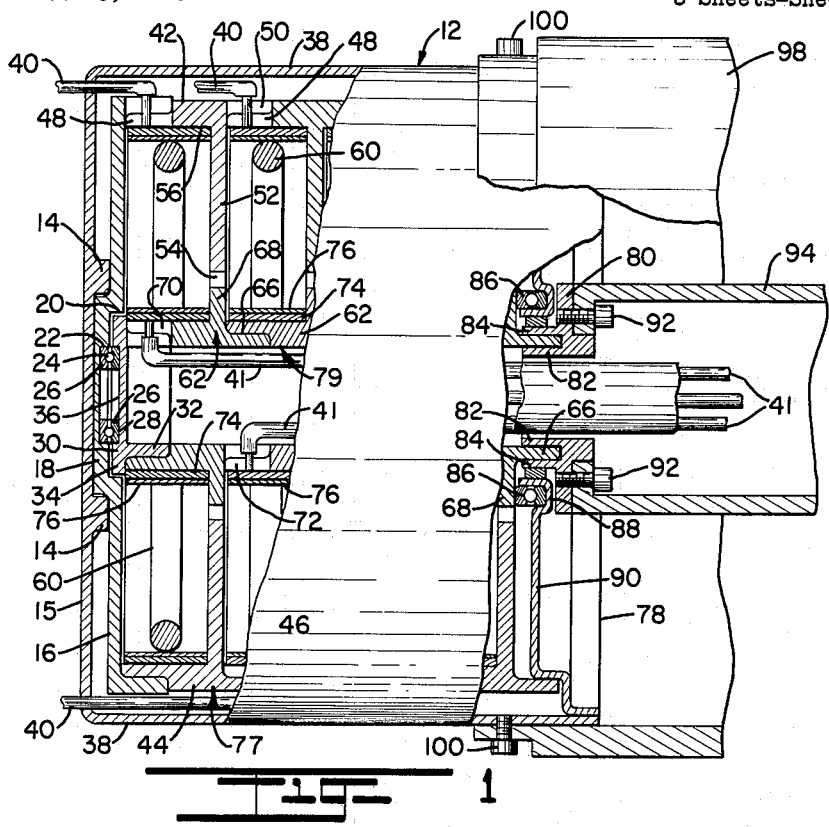
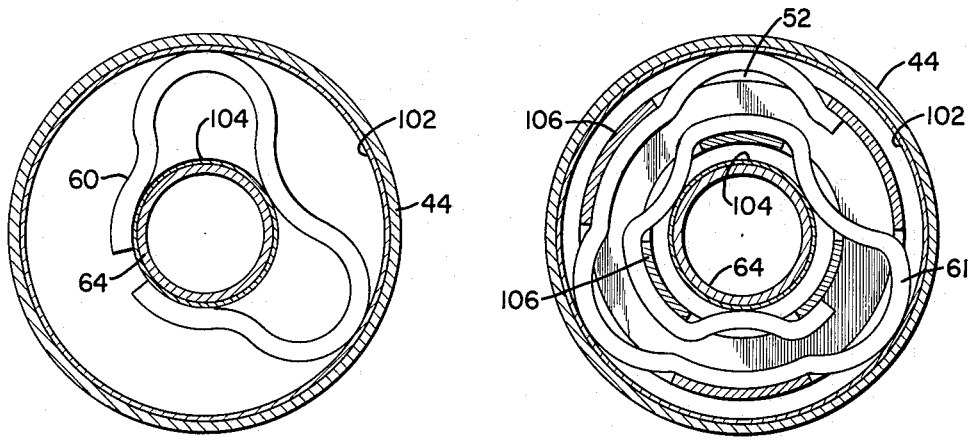
INVENTOR.
YSIDORE MARTINEZ MARTINEZ
BY
ATTORNEY Feb. 8, 1966  Y. M. MARTINEZ  3,234,495
ROTARY ELECTRIC COUPLING
Filed Feb. 8, 1963  3 Sheets-Sheet 2
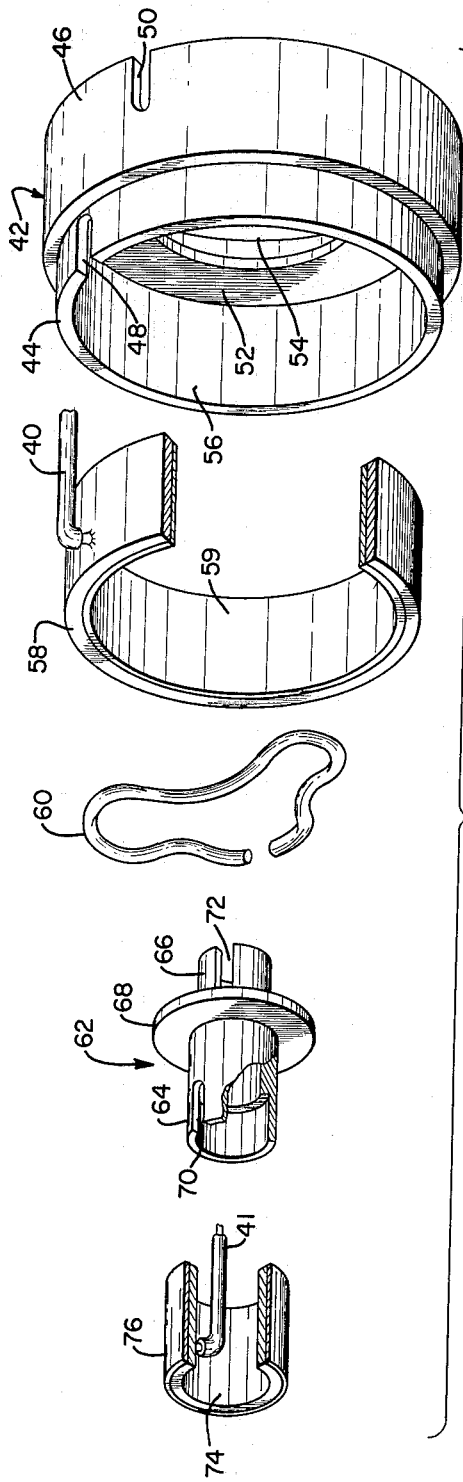
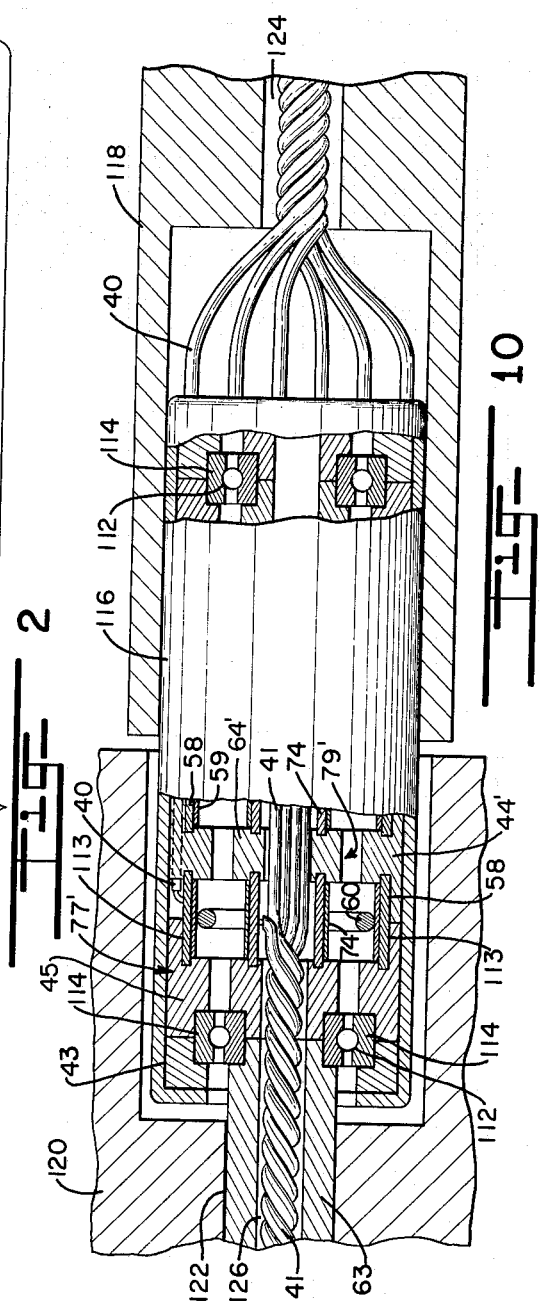
INVENTOR.
YSIDORE MARTINEZ MARTINEZ
BY
ATTORNEY

INVENTOR.
YSIDORE MARTINEZ MARTINEZ
BY
ATTORNEY

United States Patent Office 3,234,495
Patented Feb. 8, 1966

3,234,495
ROTARY ELECTRIC COUPLING
Ysidore Martinez Martinez, Denver, Colo., assignor, by mesne assignments, to Space Technology and Research Corporation, Denver, Colo., a corporation of Colorado
Filed Feb. 8, 1963, Ser. No. 257,236
9 Claims. (Cl. 339—5)

This invention relates to rotary electric couplings or connectors, more particularly, it relates to electrical coupling devices of the slip ring type in which the rotary contact elements are concentrically mounted relatively rotating cylinders having conducting surfaces electrically connected by connectors in slidable relation thereto.

The invention is particularly directed but not limited to miniature or sub-miniature apparatus of the foregoing character. It is illustrated and described by its application to slip ring connectors but is not limited to this application as it may be used as an electrical rotary coupling in general, including high speed applications and others.

Slip rings are used today in a wide range of applications, for example, they are used in miniature units for conducting signals in precision instruments, such as, gyros and potentiometers and in complex assemblies for coupling power and signal circuits, for example, in rotary radar antenna systems. They are used to handle circuits, voltages and frequencies varying between large ranges. Quite often a large number of circuits of various types are required in a single assembly. Typical applications are multi-circuit couplings used to inter-connect the gimbals on a gyro, rotating missile guidance and space tracking antennae and applications like large centrifuge research and testing installations requiring massive rotary electric couplings.

There are a number of well known problems associated with prior-art rotary electric couplings. The requirement for extreme miniaturization requires that the manufacture and assembly of the unit be as simplified as possible. The device must be capable of resisting vibration to prevent contact between the brushes. The metal to metal contact area between brushes and rings should be adequately large and the pressure between the contact surfaces should be easily regulated. It is important that the shock due to vibration of the mounting will not break the contact points and cause relative movement therebetween to destroy the contact. Weight and space problems are ordinarily critical in most of the applications in which slip ring connectors are used so that the structure of the device must be such that it can be readily miniaturized without a sacrifice of other required properties. Other problems involved in the design of rotary electric coupling devices relate to the dielectric capability of the devices to withstand high voltage, susceptibility of the devices to cross talk, electrical erosion between contact points, open circuiting, shorts and others.

Accordingly, it is an object of this invention to provide a rotary electric coupling device which is simple in construction and can be manufactured in miniaturized form by simple assembly techniques;

It is another object of this invention to provide a rotary electric coupling device in which respective brushes or connectors and conducting surfaces are separately encapsulated so that no contact is possible between connectors due to shock and vibration;

It is another object of this invention to provide a rotary electric coupling device in which the contact members are relatively rotatable at least 360° independently of each other with continuous electrical connection maintained between them;

It is another object of this invention to provide an electrical coupling device of the rotary type in which electrical erosion between the contact points is reduced to a minimum and in which the erosion products of a unit are isolated from other units of an assembly.

It is a further object of this invention to provide a rotary electrical coupling device of improved dielectric quality sufficient to withstand high voltages, and which is subject to a minimum of cross talk, open circuits between contact points and shorts.

It is still another object of this invention to provide a slip ring connector comprising two relatively rotatable concentrically mounted cylinders made up of individual encapsulated modules axially stacked to form the cylinders in which each module comprises two relatively rotating conductive surfaces slidably connected by an electrical connector and each being connected to a separate outlet or inlet.

The above and other objects are accomplished by an electrical connector of the slip ring type comprising two concentrically mounted insulated cylinders relatively rotatable independently of each other through 360°, the cylinders being made up of axially stacked connected modules, each module comprising inner and outer insulated cylindrical contact members each having a conducting surface with the conducting surfaces electrically connected by a slidable brush or connector. Each pair of inner and outer cylindrical contact members of the individual modules are enclosed between two axially spaced cylindrical insulating walls comprised of relatively rotating aligned sections to form individual encapsulated modules with adjacent modules having common walls and the modules stacked axially of the slip ring connector assembly, each module containing the two concentric cylindrical contact members having conducting surfaces connected to a respective outlet and inlet and connected together by the slidable connector which permits relative rotation between them through 360° with continuous electrical connection maintained between the outlet and inlet, the wall sections rotating with respective inner and outer contact members. The invention also includes the individual modules which can be used singly; however, in most applications it is preferable to use the stacked version to provide the additive advantages of the additional modules. The conducting surfaces may be metal coatings electrodeposited or coated on metal rings or on ceramic or plastic contact members, or they may be metalized ceramic or plastic surfaces or metal ring surfaces themselves. In one application of the connector the inner and outer cylinders are connected to respective structures, such as, parts of a joint relatively movable through angles up to 360°, for example a gimbal joint, through which it is required to maintain continuous electrical contact between instruments inside a missile and recording devices at ground stations.

In the specification and claims the individual encapsulated slip ring conductor units will be referred to as modules and the composite modular assembly of modules comprising a unified physical unit will be referred to as the rotary electrical coupling or slip ring connector assembly. The relatively rotating parts of the slip ring connector assembly will be referred to as the inner and outer cylinders. The term "brush" or "connector" means the conducting element between the conducting surfaces of the contact elements. By "encapsulated" is meant compartmentalized or mounted in an individual compartment to prevent contact of the enclosed elements with those of adjacent compartments.

Reference is now made to the accompanying drawings in which like parts are represented by like numerals and in which:

FIG. 1 is a sectional view partly broken away of the slip ring connector assembly of the invention schematically showing it attached to external structures;

FIG. 2 is an exploded view of the assembly of FIG. 1;

FIG. 3 is an end view showing of the connector element used in the assembly of FIG. 1 illustrating its assembly between contact members;

FIG. 4 is a showing of a modified connector element as in FIG. 3 schematically showing the arrangement for supporting it between contact members;

FIG. 10 is a cross-sectional view partially cut away of the slip ring connector assembly mounted in a structure of two parts relatively rotatable through 360° and;

Figure 5:
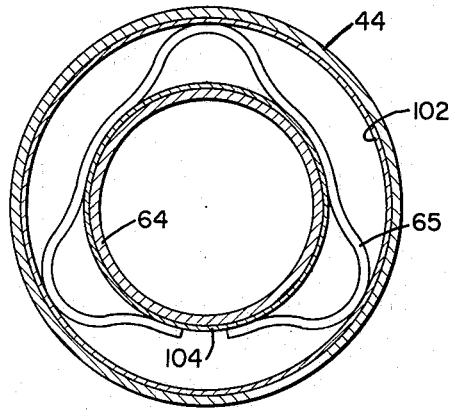
FIGS. 5, 6 and 7 are views as in FIGS. 3 and 4 showing different modifications of connector elements.

Referring to FIGS. 1 and 2, there is shown an outer case 12 of suitable material, preferably a dielectric material, such as plastic. Metallic materials may be used for the case depending upon the requirements.

The method and structure for rotatably mounting one end of the inner cylinder of the electrical connector will now be described. The case has a centrally located annular boss 14 on the internal surface of one of its ends 15. A circular mounting end 16 for the slip connector assembly, preferably of plastic material, is provided with annular external boss 18 and internal stepped seats 20 and 22. The mounting end 16 is mounted on case end 15 by seating external boss 18 in annular internal boss 14 and securing it by molding or otherwise. A ball race 24 comprising mating race members 26 is seated in internal seat 22 of mounting end 16 and is provided with bearing members 28, in this case, ball bearings. The race member adjacent seat 22 is secured therein by press-fitting, with the use of suitable adhesives or otherwise. A thrust plate member 30 of dielectric material, preferably of ceramic or plastic material, of circular configuration and constructed with hub 32 and annular flange 34 is mounted and secured in seat 20 with an external seat 36 receiving the outer race which is press-fitted therein. The rotatably mounted thrust plate 30 supports the inner cylinder 79. The mounting end 16 is dimensioned so that clearance is provide between it and the sides 38 of the case to provide space for wires or lead conductors 40. The above described mounting structure is by way of illustration only as various other equivalent structure may obviously be used.

The description of the composite cylindrical slip ring connector assembly is facilitated by reference to the exploded view of a unit module assembly shown in FIG. 2 in which metal coatings on metal rings are used for conducting surfaces. This embodiment is used for purposes of illustration only as the conducting surfaces may take various forms, such as, metal-plated or electrodeposited on plastic or on ceramic, or it may be metalized plastic or ceramic, or may take other similar forms.

The outer module unit 42 is comprised of outer cylindrical contact member 44 and outer module case section 46 sealed together or made integrally. The outer module unit 42 is constructed for mating on either side with an identical outer module unit. The contact member 44 and the outer module case section 46 are provided with slots 48 and 50, respectively, for receiving conductor leads and these slots mate with corresponding slots of the respective mating sections to leave holes through which the conductor lead may be passed. The outer module unit 42 is provided with an internal radial wall 52 having a central opening 54 therein, the wall preferably being attached to the inner edge of the outer cylindrical contact member 44. The outer module unit 42 is made of dielectric material and preferably of ceramic, or suitable plastic. Suitable ceramics are lithium and aluminum silicate ceramics such as those sold under the name of "Lithafrax" made by the Electronics Division of the Carborandum Co., Latrobe, Pennsylvania. Other suitable materials are beryllium oxide ceramics and alumina ceramics made by the Coors Porcelain Co., of Golden, Colorado. A conducting surface is supported internally of the outer cylindrical contact member 44. The internal surface 56 of the member 44 may be coated with a conducting coating as hereinafter explained to form the external conducting surface of the outer cylinder, or the surface may be metalized ceramic, or it may serve to support an internally seated metal ring as a conductor which may or may not have a conductive coating of another metal thereon. As will be set forth hereinafter certain modifications of the invention provide for a conducting coating on the external surface of contact member 44.

The next internally seated member of the unitary module assembly in the embodiment illustrated in FIG. 2 is the metal ring 58. The metal conducting ring 58 is preferably provided with an internal conducting coating 59 and is assembled into the outer cylindrical contact member 44 with lead conductor 40 attached in secure electrical conducting relationship with the metal ring and thereby conducting coating 59. A metal ring without a conducting coating may be used. The rings used may be made from tubing of specified thickness. The conducting coating may be an electrodeposit of copper and/or silver, and nominally 24 caret hard gold. Gold alloys or rhodium-plated or gold-plated coin silver may be used. The metal ring 58 of slightly smaller diameter than member 44 may be secured in the member 44 by suitable metal to plastic or ceramic adhesives or by cooling it under cryogenic conditions and allowing it to expand into member 44.

A conducting connector to maintain continuous electrical contact between the two cylindrical conducting surfaces supported in the module is shown at 60. This particular configuration of connector is also used in the assembly when conducting surfaces on the ceramic contact members are used rather than metal rings. The connector is of relatively small cross-section of circular or other design and is of flexible metal so that it has a resiliency which creates a restoring force when its normal configuration is altered. It may be made of any suitable conducting material, preferably of metal or alloys thereof. Preferred materials are noble metals, alloy steel, copper and aluminum base alloys, wire and other special material as the particular application requires. The metals in electrical contact, including connector and conducting surface, are chosen to provide low contact resistance.

An inner module unit is shown at 62 comprising hub 63 having large diameter rim 64 and small diameter rim 66 separated by annular flange 68 which may be constructed integral with the hubs or otherwise. This inner module unit is also of dielectric material and preferably of the same material as the outer module unit 42. The outer surface of the large rim 64 supports the inner conducting surface which may be plated on the rim surface with an electrodeposit or coating of suitable metal to provide a conducting coating or the rim surface may be of metallized ceramic or plastic. Instead of the conducting coating on the ceramic surface of the rim 64, a metal ring which may or may not have a conducting coating on its outside surface may be fitted over the rim. This metal ring and the conducting surface thereon are preferably of the same materials as that for outer metal ring 58 and its conducting surface. Slots 70 and 72 are provided in the rims 64 and 66, respectively, for the passage of lead conductors. In the case an electrodeposited or electroplated metal coating is used for the conducting coating, the openings for the leads can be made with a diameter approximately that of the leads.

An inner metal ring is shown at 74 having an external conducting coating 76 of suitable metal on its outer surface. Lead conductor 41 is secured to the internal surface of the inner metal ring 74 in electrical conducting relationship. In assembly, the inner metal ring 74 is fitted over rim 64 with the lead 41 fitting in slot 70, for example. This metal ring of slightly larger diameter than rim 64 may be heated and shrunk-fit over the ceramic rim 64 or it may be sealed thereto with suitable metal-to-ceramic or plastic adhesives. The lead conductors 40 and 41 are referred to herein as internal and external leads meaning that the leads are interchangeable and either lead may be connected, for example, to instruments inside a missile or to recording elements at a ground station when the electrical connector is used in this particular application. The slip ring leads may be a single copper conductor insulated with extruded Teflon or nylon or other suitable insulating material. Other metals and alloys may be used for the conductor material.

In assembly of the unitary module, the connector 60 is fitted over metal ring 74 which has been assembled on rim 64 with lead conductor 41 in place and the assembled unit fitted into metal ring 58 which has been secured in place in outer cylindrical contact member 44 with lead conductor 40 in place. Member 44 is previously secured in outer module unit 42 if the two are not made integral. The construction of connector 60 causes it to be spring-biased into tight-fitting relationship between the internal conducting surface 59 of outer metal ring 58 and the external conducting surface 76 of inner metal ring 74 to effect continuous electrical connection between the surfaces and yet permit relative rotation therebetween. In the assembled module, annular flange 68 of inner module unit 62 aligns with wall section 52 of outer module unit 42 to form a common wall for two modules having relatively rotatable inner and outer sections corresponding, respectively, to inner and outer conducting surfaces and separating adjacent module compartments. The module walls serve to keep the connector elements 60 in proper radial orientation or alignment and to prevent contact between connector elements in adjacent compartments. The walls are close enough together to prevent radial misalignment of the connector elements and to support them in the proper orientation. The inner wall section or flange 68 which rotates with the inner conducting surface and the outer wall section 54 which rotates with the outer conducting surface are, of course, rotatable with respect to each other and must be dimensioned so that they do not jam. Sufficient space may be left between their peripheries to permit relative rotation between them and yet not interfere with the performance of the functions of the wall as set forth above.

It is seen that smaller rim section 66 will extend beyond the wall section for mounting of the rim 64 of the next module to the left of it over it and that the outer cylindrical contact member 44 of the next unit to the left with its seated outer metal ring 58 will seat inside outer module case section 46 to form the succeeding stacked unitary module when a series of modules are assembled together. A module to the right will also mate on the right side of the assembled module with the small rim 66 of the right module fitting inside the large rim 64 and outer module case section of the right module fitting over contact member 44 of the assembled module. The mating hub parts and contact member and case section parts are secured together with suitable adhesives for plastics and ceramics, such as, epoxy resins to complete the assembly of inner and outer cylinders of the composite assembled electrical connector.

Referring again to FIG. 1, it will be seen how the unitary modules are stacked to form the composite modular electrical connector or slip ring connector assembly of stacked units. Each unit is assembled as described above for the assembly of the unitary module before assembling in the case. Metal ring 74 is shrunk over the hub of module 62 and connector 60 is positioned around metal ring 74, and outer module unit 42 with outer metal ring 58 seated inside outer cylindrical contact member 44 is slipped over the connector 60 to complete the assembly of one module. The ceramic or plastic mating parts of the module sections are secured together by a suitable adhesive such as epoxy resins or others. The same procedure is followed for assembly of the next module until the assembly is completed. It will be seen that a composite assembly is formed of individual encapsulated modules defined, for example, in the second module from the left in the assembly of FIG. 1, by aligned wall sections 52 and 68 on either side of the module and radially by conducting surfaces 59 and 76 of the outer and inner rings, respectively. It will be noted that when the unitary module sections are secured together two concentrically mounted cylinders, outer cylinder 77 and inner cylinder 79, are formed which are rotatable relative to each other through 360° and are comprised of the stacked modules having relatively rotatable upper and lower sections to provide for relative movement between the insulated conducting surfaces in each module through 360° with continuous electrical connection therebetween being maintained by the connectors 60. The terms "inner cylinder" and "outer cylinder" as used herein and in the claims refer to the above-described cylinders. The above described structure defines a preferred illustrative construction for accomplishing the objective of two relatively rotating insulated conducting surfaces electrically connected together by connectors and connected to internal and external leads, respectively, being encapsulated as separate units for operation in individual compartments of a composite assembly of compartments with the connectors maintained in proper radial alignment and with no possibility of contact between them. Equivalent structure for achieving the objective may be used.

A construction is shown at the end 78 of the slip ring connector for mounting the inner and outer cylinders of the slip ring connector in relatively rotatable relationship through 360° and for attaching the inner and outer cylinders, respectively, to two relatively rotating structures. The rim 66 of the inner module unit 62 of the last module is mounted in annular support member 80 formed as shown with an annular groove between two upstanding annular bosses 82 and 84. This assembly is rotatably mounted by means of ball race 86 between annular flange 68 and the rim 88 of annular end plate 90. Suitable alternate bearing arrangements may be used for rotatably mounting the assembly. As shown, support member 80 may be attached by suitable bolts 92 to one of two relatively rotating structures 94 provided with a channel 96 to permit the passage of leads 41. Outer case 12, which is secured to and rotates with the outer cylinder 77 of the composite slip ring connector may be attached to the other of the two relatively rotating structures 98 by bolts 100 as shown. The leads 40 are, of course, carried by structure 98. It is thus seen that as the two structures 94 and 98 rotate relative to each other the inner and outer cylinders 77 and 79 will also rotate relative to each other so that continuous electrical connection is maintained between leads 40 and 41.

The above described construction for mounting the end of cylinder 79 so that it is rotatable in the case 12 with respect to cylinder 77 and so that both cylinders can be attached to external rotating structures, respectively, is by way of illustration as other structures performing the equivalent function may be used.

In FIG. 3, the connector 60 shown in FIG. 2 is shown mounted between ceramic rim 64 of the inner module unit 62 and outer cylinder ceramic contact member 44. The outer cylindrical contact member 44 and the rim 64 or inner contact member are provided with conducting coatings 102 and 104, respectively, to provide the two conducting surfaces connected by connector 60. Internal and external cylinder leads 40 and 41 (FIG. 2) are connected to the coatings through holes or slots (FIG. 2) in the ceramic contact members.

Modified connector 61 shown in FIG. 4 is of serpentine construction and is in contact with the metal coatings 102 and 104 of the inner and outer ceramic rings or module contact sections 64 and 44, respectively. In the modification shown in FIG. 4 the wall 52 of the outer module unit 42 is provided with annular extending rims 106 which are provided with openings through which the resilient connector 61 is threaded for support.

Figure 6:
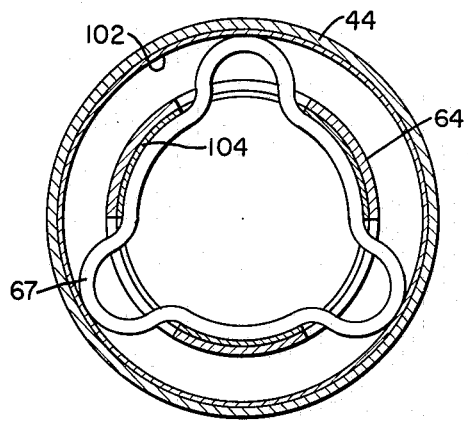
Figure 7:
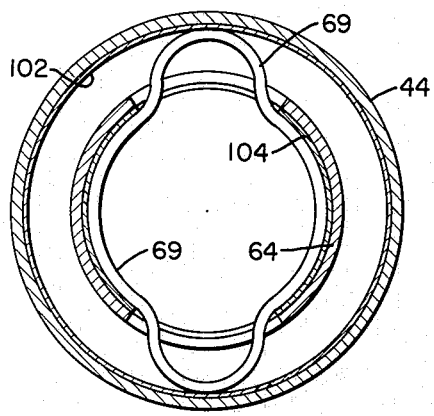

FIGS. 5, 6 and 7 show various modifications of connectors 65, 67 and 69 which may be used between the two cylindrical relatively rotating conducting surfaces of the modules. It is to be noted that the various modifications of FIGS. 3–8, inclusive, show alternative arrangements in which the conducting surfaces may be supported on either side of the contact or support elements. The connectors of these three modifications are again dimensioned to permit spring-biasing them into position between the two conducting surfaces. In each of the modifications shown in FIGS. 5, 6 and 7 the conducting surfaces are metal surfaces electrodeposited or otherwise secured to the ceramic inner and outer cylindrical contact members of the modules, and as explained with respect to FIGS. 3 and 4, conductor leads are secured in electrical conducting relationship with the conducting coatings. It is to be noted that in FIGS. 6 and 7 the connectors 67 and 69, respectively, do not move relative to the inner ceramic ring or rim 64, but do move with hub 64 relative to the outer cylindrical contact member 44. It is further noted that the conducting coating 104 carried by the hub 64 is on its internal surface.

Figure 8:
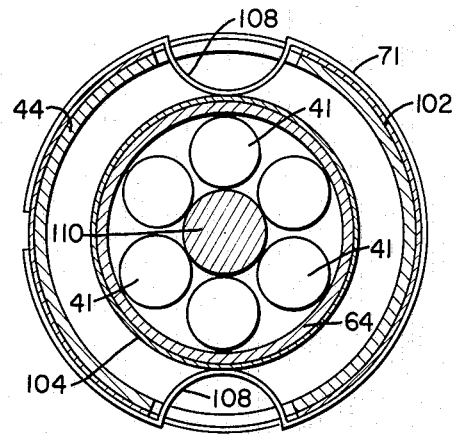
FIG. 8 is a cross-sectional view of an assembly of connector and contact members showing a modified connector and an arrangement for supporting the assembly.

In FIG. 8 the connector 71 is constructed with internally curved contact elements 108 designed to fit against the external coating 104 on rim section 64. It is noted that in this case the coating 102 for the outer cylindrical contact member 44 is on the outside thereof. This modification of the connector element permits accurate control of the pressure between the contact surfaces by adjustment of the radius of curvature of the contact elements 108. This modification is particularly useful in subminiature slip ring assemblies where the critical noise level can be controlled by controlling the pressure developed in contact between the brush or connector and electroplated or metal conducting surface. A rigid support member 110 of rod-like construction may be located centrally of the leads 41 as an example of the type of support which can be used in any of the modifications of the invention. The invention is not restricted to this type of support means for the conductors as others can be used. For example, after assembly without the internal support member 110 the voids can be filled with epoxy resin or other suitable resin in fluid condition under pressure and the epoxy resin allowed to set and harden to form a rigid support for connectors 41.

Figure 9:
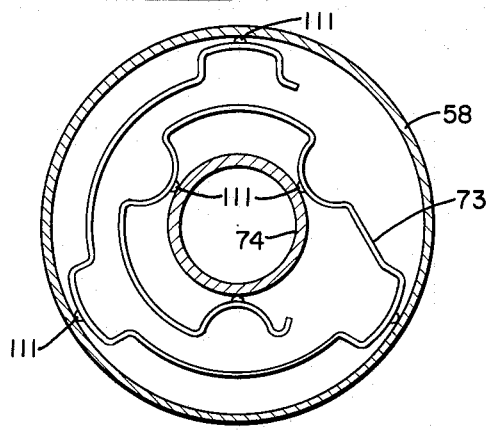
FIG. 9 is a showing as in FIG. 3 of a modified connector in assembly between metal rings serving as contact members.

In FIG. 9 a modified connector 73 is shown. This connector is of serpentine construction and is preferred when metal rings are used as the contact surfaces with or without conductive coatings thereon. It will be noted again that this connector is constructed to be spring-biased into contact with both the inner and outer metal rings 74 and 58 respectively. It may be of outwardly curved cross-section axially and radially to provide a contact surface. It is provided with contact points 111 which may or may not ride in a groove in the internal surface of metal ring 58. The contact point may be made by a spherical indentation in the connector 73 of this modification. The contact point, with or without a mating groove in the corresponding conducting contact surface, is an alternate construction which may be used in all of the connector elements. A further alternate construction is an annular rib on the coating and a mating groove in the connector formed by making the connector of concave cross-section.

Reference is now made to FIG. 10 for a description of the slip ring connector of the assembly in which the individual modules are stacked in a different arrangement from that of FIG. 1 and in which the two rotating cylinders 77′ and 79′ are connected, respectively, to relatively rotating structures. In this modification, the inner and outer modules are of solid ring construction and are provided with annular grooves 113 in their end faces in which are mounted outer and inner metal rings 58 and 74, respectively. The rings either form or support inner and outer conducting surfaces. The rings are press-fitted in the grooves or sealed therein by adhesives or other suitable means so that a rigid stacked assembly of modules is provided constituting the outer cylinder 77′ and the inner cylinder 79′ of the composite slip ring connector. The inner and outer rotatable conducting surfaces are connected one to an external and one to an internal lead. The inner and outer cylinders 77′ and 79′ are rotatably mounted with respect to each other by means of ball races 112 and bearings 114 fitted into annular grooves in the bushing members 43 and 45 as shown.

In one application of the slip ring connector the structures 118 and 120 may represent relatively movable elements of a gimbal joint between missile parts and the leads 41 may extend to instruments inside the missile and the leads 40 carry intelligence signals from the instruments to recording devices outside the missile or to another section of the missile so that continuous information is available to ground stations as to the operation of missile elements while the missile is on the pad and before it is launched, or between missile sections.

The method of assembly of the slip ring connector of FIG. 10 is as follows. The slip ring assembly is completed before the outer cylinder 77′ and inner cylinder 79′ are inserted in the case and attached to the correspondingly relatively rotating structures. The leads 40 and 41 are first arranged with the ends of appropriate leads in position to contact their respective contact rings. Beginning at the left hand side of the assembly shown in FIG. 10, elongated inner module section 63 is slipped over the leads 41 and placed in the case. Outer bushing member 43 is then inserted in the case. The ball race 112 is positioned in the annular indentation in bushing 43 as shown. The modified outer module unit or inner bushing 45 is then inserted and secured by suitable adhesive or otherwise to bushing 43. The pre-assembled cylinders 77′ and 79′ are then inserted in the case and the outer contact sections 42′ are secured to the case by suitable adhesives. In the pre-assembly of the cylinders 77′ and 79′ the inner metal ring 74 is inserted in the annular groove 113 in the inner module unit 64′, the connector 60 is positioned around the ring 74 and the outer ring 58 placed over the connector in the annular grooves 113 in the outer contact element 44′. The lead conductors are welded to the metal rings as the assembly proceeds from unit to unit. This procedure is followed for the assembly of additional units.

In an illustrated application of this modification of the invention, the outer case 116 is secured to structure 118 which moves or rotates relative to structure 120. Through this arrangement the outer cylinder 77′ of stacked outer module units 44′ will rotate with structure 118. The inner cylinder 79′ composed of stacked inner contact units 64′ is attached to structure 120 at 122 so that it rotates with structure 120. Accordingly, as structures 118 and 120 rotate relative to each other the inner and outer cylinders 77′ and 79′ of the slip ring conductor will also rotate relative to each other and continuous electrical contact will be maintained between leads 40 and 41. Channels 124 and 126 are provided in structures 118 and 120, respectively, through which lead conductors 40 and 41 pass.

A support member as shown in FIG. 8 can be used in the center of the leads 41 to support them or they can be supported by epoxy resin or other type resin introduced in liquid form by gravity or under pressure into the spaces between them and allowed to cure or harden.

Figure 11:
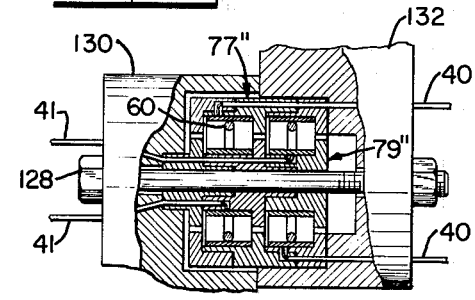
FIG. 11 is a cross-sectional view partially in schematic showing another application of the electrical connector of the invention used with external relatively rotatable structures.

Referring to FIG. 11, a schematic showing of the slip ring assembly used in another type joint member is shown. In this showing the strucutres or arms 130 and 132 of the joint are relatively rotatable and are held together by bolt 128. The relatively rotating cylinders 77" and 79" are nested in internally corresponding cut out sections of the structures 130 and 132 and the bolt 128 passes through the hollow inside the inner cylinder 79". The outer cylinder 77" is secured to structure 132 by suitable adhesives or otherwise to rotate with it and the innner cylinder 77" is secured to structure 130 to rotate with it. Conductors 41 connected to the inner conducting surfaces are supported by structure 130 and conductors 40 connected to the outer conducting surfaces are supported by structure 132.

Any suitable method may be used to weld the lead conductors 40 and 41 to their appropriate conducting surfaces so long as a secure electrically conducting union between the leads and the corresponding conducting surfaces is achieved. A preferred method is as follows: The welding is effected by instantaneously and simultaneously contacting the end of the lead conductor to the conductive surface with pressure and impressing a large voltage through the conductor. The effect of this procedure is to melt a small area of the conducting surface by the large voltage and immediately impress the end of the lead conductor into the melted area where it is effectively welded. The application of mechanical pressure to the lead to press it against the melted conducting surface as voltage is simultaneously applied to the lead can be achieved by a spring-biased member placed adjacent the lead which is operative on release to exert pressure on the lead simultaneously with the application of voltage to the lead. Other methods for effecting a secure conducting joint between the wire and the conducting surface may obviously be used.

While the rotary electrical coupling of the invention has been illustrated by its application to slip ring connectors it is by no means limited to this application as it can be used in various applications where rotary electrical couplings are required, including high speed applications.

It is thus seen from the above description that a rotary electrical coupling device has been provided which is of simple construction and can be manufactured in miniaturized form by simple assembly techniques. The invention provides means for insulating electrical contact members by encapsulating the members of each unit in single insulating compartments which may be axially stacked to form relatively rotating cylinders of a composite assembly. The various types of connector elements which form a part of the invention are subject to simple assembly techniques for incorporation in the units and provide a wide variety of modifications to suit wide ranges of applications. The construction of the contact elements located between conducting surfaces provide for multiple contact points to insure continued contact without open circuits and are subject to precise adjustment to control the pressure between them and the conducting surfaces. The encapsulation features of the invention insure that the connector elements are maintained in proper radial alignment and that there is no possibility of contact between them due to shock and vibration. The rotary electrical coupling of the invention is readily adaptable for the various applications in which such couplings are used, such as gimbal joints, radar antenna systems, and others. The invention provides a means for encapsulating modular units of composite relatively rotating cylinders of the coupling in separate insulating compartments in which the compartments are sectionalized into rotating parts to provide continuous compartmentation of the individual units during relative rotation of the cylinders.

It is therefore to be understood that various modifications and changes may be made in the construction and arrangement of parts of the present invention without departing from the spirit and scope thereof as defined by the appended claims.

What is claimed is:

1. Rotary electrical connector apparatus comprising: a pair of concentrically mounted relatively rotatable cylinders comprised of stacked modules of insulating material, each module comprising: a hollow inner module unit having a large hollow cylindrical hub serving as an inner hollow ring of substantial width with a large rim and a small rim and having an annular flange between the rims serving as an inner wall section, an inner circular conducting surface supported on said inner ring, an outer cylindrical module unit comprised of a hollow outer module case section and an outer cylindrical hollow ring of substantial width of lesser diameter and having an annular outer wall section located centrally thereof, an outer circular conducting surface supported on said outer cylindrical ring; said inner module unit being nested in said outer module unit with said wall sections in alignment to form one wall of said module, and a slidable electrical connector disposed between said conducting surfaces comprising a single looped member encompassing the inner conducting surface beyond 180° and contacting both inner and outer circular conducting surfaces in at least two places; said assembly of inner and outer module units adapted to nest with an adjacent identical assembly with the small rim and outer module case section of the adjacent assembly nesting in said large rim and over said outer ring, respectively, to form a module compartment bounded by the two rings and two walls whereby inner and outer relatively rotating composite cylinders are formed in which the inner cylinder is comprised of assembled inner module sections and the outer cylinder is comprised of outer module sections; and an electrical conductor for each of said surfaces attached to the face thereof.

2. A rotary electrical coupling apparatus comprising: a plurality of stacked modules forming a pair of inner and outer concentrically mounted relatively rotatable integral cylinders of insulating material, each module comprising a pair of hollow, circular concentrically mounted inner and outer relatively rotatable hollow rings of substantial width, each ring having a conducting surface on at least one of its peripheral faces constituting, respectively, an inner and outer circular conducting surface integrally formed, a slidable electrical connector comprising a single looped member encompassing the inner circular conducting surface beyond 180° and contacting both inner and outer circular conducting surfaces in at least two places, insulating walls on either side of said contact elements, and each of said walls comprised of relatively rotatable inner and outer sections attached, respectively, to said inner and outer rotatable rings; at least one electrical conductor connected directly to each conducting surface; an outer cylindrical case over said outer cylinder and spaced therefrom to form a channel; said outer cylinder being fixedly attached to said case and said inner cylinder being rotatably attached to said case; all of said conductors attached to said inner conducting surfaces passing through the bore formed by the hollow of said inner cylinder and all of said conductors attached to said outer conducting surfaces passing through said channel.

3. Rotary electrical coupling apparatus comprising: a pair of concentrically mounted inner and outer integral cylinders relatively rotatable through 360°, said cylinders comprised of a plurality of stacked modules of insulating material, each module comprising: a pair of circular concentrically mounted inner and outer relatively rotatable hollow rings of insulating material each supporting a continuous conducting surface on at least one of its peripheral faces constituting, respectively, an inner and an outer circular conducting surface, a slidable electrical connector comprising a single looped member encompassing the inner circular conducting surface beyond 180° and contacting both inner and outer circular conducting surfaces in at least two places and being in slidable relation to at least one surface, and insulating walls on either side of said rings, each of said walls comprised of relatively rotatable inner and outer sections mounted to rotate, respectively, with said inner and outer rotatable rings; and at least one electrical conductor directly connected to the face of each conducting surface; whereby axially spaced compartments are formed between adjacent walls of said cylinders bounded by said inner and outer rings and said insulating walls.

4. The apparatus of claim 3 in which said conducting surfaces are on the outer and inner surfaces, respectively, of said inner and outer rings.

5. The apparatus of claim 3 in which said conducting surfaces are on the inside of said inner and outer rings and said inner ring is provided with openings through which the contact portions of the connector means extend for contact with said conducting surface of said outer ring.

6. The apparatus of claim 3 in which said conducting surfaces are on the outside of said inner and outer rings and said outer ring is provided with openings through which the contact portions of the connecting means extend for contact with said conducting surface of said inner ring.

7. The coupling apparatus of claim 3 in which said stacked modules are constructed of ceramic material.

8. A rotary electric coupling device comprising: an outer case; an outer integral hollow cylinder of insulating material fixedly mounted in said outer case and spaced apart from said outer case to form a channel between it and the outer case; an inner integral hollow cylinder of insulating material mounted for rotation relative to said outer case and concentrically of said outer cylinder; at least one radially extending partition between said cylinders sectioned to permit relative rotation between said cylinders and dividing the space between adjacent walls of said cylinders into axially spaced compartments; an outer continuous circular conducting surface having a width greater than its thickness in each of said compartments supported on said outer cylinder; an inner continuous circular conducting surface having a width greater than its thickness in each of said compartments supported on said inner cylinder; a slidable electrical connector comprising a single looped member encompassing the inner circular conducting surface beyond 180° and contacting both inner and outer circular conducting surfaces in at least two places; an electrical conductor for each of said outer conducting surfaces connected directly to the peripheral face of each of said outer conducting surfaces and extending from the peripheral surface to which it is connected into said channel and therethrough to the exterior of said case; an electrical conductor for each of said inner conducting surfaces connected directly to the peripheral face of each of said inner conducting surfaces and extending from the peripheral surface to which it is connected into the bore of said inner cylinder and therethrough to the exterior of said case.

9. Rotary electrical connector apparatus comprising: an outer case; a pair of concentrically mounted relatively rotatable inner and outer cylinders comprised of stacked modules of insulating material in said case, said outer cylinder spaced apart from said case to form a channel between it and the case, said inner cylinder being relatively rotatable with respect to said outer cylinder, each module comprising: a hollow inner module unit of insulating material having a hollow cylindrical hub serving as an inner hollow ring and comprising a large rim and a small rim with an annular flange of insulating material between the rims serving as an inner wall section, an inner continuous circular conducting surface supported on one of the peripheral surfaces of said inner ring; an outer cylindrical module unit of insulating material comprised of a hollow outer module case section and an outer hollow ring of substantial width of lesser diameter than said outer module case section and having an annular outer flange serving as a wall section located centrally thereof, an outer circular conducting surface supported on one of the peripheral surfaces of said outer cylindrical ring, said inner module unit being nested in said outer module unit with said wall sections in alignment to form one complete wall of said module, and a slidable electrical connector comprising a single looped member encompassing the innner circular conducting surface beyond 180° and contacting both inner and outer circular conducting surfaces in at least two places; said assembly of inner and outer module units adapted to nest with an adjacent identical assembly with the small rim and outer module case section of the adjacent assembly nesting in said large rim and over said outer ring, respectively, to form a module compartment bounded by two rings and two walls; at least one electrical conductor connected to the face of said conducting surface on said outer ring, extending into said channel and therethrough to the exterior of said case; at least one electrical conductor connected to the face of said conducting surface on said inner ring, extending into the bore of said inner cylinder and therethrough to the exterior of said case; whereby inner and outer relatively rotating composite cylinders are formed in which the inner cylinder is comprised of assembled inner module sections and the outer cylinder is comprised of outer module sections.

References Cited by the Examiner
UNITED STATES PATENTS

| | | | |
|---|---|---|---|
| 2,467,758 | 4/1949 | Lindenblad | 339—9 X |
| 2,473,526 | 6/1949 | Hood et al. | 339—5 |
| 2,490,329 | 12/1949 | Wilde | 170—160.23 |
| 2,696,570 | 12/1954 | Pandapas | 339—5 X |
| 2,766,625 | 10/1956 | Swanson | 74—5 |
| 2,894,134 | 7/1959 | Rieth | 339—5 X |
| 3,017,595 | 1/1962 | Drollinger | 339—8 |

FOREIGN PATENTS

| | | |
|---|---|---|
| 1,216,141 | 11/1959 | France. |
| 607,438 | 8/1948 | Great Britain. |
| 617,762 | 2/1949 | Great Britain. |

JOSEPH D. SEERS, *Primary Examiner.*

A. S. TRASK, *Assistant Examiner.*